United States Patent
Bressoud et al.

(10) Patent No.: US 7,197,040 B2
(45) Date of Patent: Mar. 27, 2007

(54) SYSTEM AND METHOD FOR OPTIMALLY CONFIGURING BORDER GATEWAY SELECTION FOR TRANSIT TRAFFIC FLOWS IN A COMPUTER NETWORK

(75) Inventors: Thomas C. Bressoud, Granville, OH (US); Rajeev Rastogi, Chatham, NJ (US); Mark A. Smith, Jersey City, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1059 days.

(21) Appl. No.: 10/186,761

(22) Filed: Jul. 1, 2002

(65) Prior Publication Data

US 2003/0142682 A1    Jul. 31, 2003

(51) Int. Cl.
  *H04L 12/28* (2006.01)
  *G06F 15/173* (2006.01)
  *G06F 9/46* (2006.01)

(52) U.S. Cl. .................................. 370/401; 709/241

(58) Field of Classification Search ................ 370/389, 370/392, 400–402, 238, 351; 718/102, 104, 718/105; 709/238, 241
See application file for complete search history.

(56) References Cited

U.S. PATENT DOCUMENTS

2002/0141343 A1 * 10/2002 Bays .......................... 370/235
2006/0075136 A1 *  4/2006 Iwata ......................... 709/238

OTHER PUBLICATIONS

L. Gao & J. Rexford, "Stable Internet Routing Without Global Coordination" Proceedings of ACM Sigmetrics, Jun. 2000, pp. 307-317.

R. Govindan & A. Reddy, "An Analysis of Internet Inter-domain Topology and Route Stability" INFOCOM '97, Apr. 1997, pp. 850-857.

B. Fortz & M. Thorup, "Internet Traffic Engineering by Optimizing OSPF Weights" Proceedings of IEEE INFOCOM 2000, pp. 519-528.

Y. Rekhter & T. Li, "A Border Gateway Protocol 4" Internet-Draft (RFC1771), Feb. 1998, 57 pages.

J.W. Stewart III, "BGP4: Inter-Domain Routing in the Internet" Addison-Wesley, 1999, pp. 57-58.

C. Labovitz, G.R. Malan & F. Jahanian, "Internet Routing Instability" in Proceedings of ACM SIGCOMM, 1997, 20 pages.

J.H. Lin & J.S. Vitter, "Approximations with Minimum Packing Constraint Violation" Proceedings of the 24th Annual ACM Symposium on the Theory of Computation, Victoria, Canada, May 1992, pp. 771-782.

D.B. Shmoys & E. Tardos, "An Approximation Algorithm for the Generalized Assignment Problem" Mathematical Programming A, vol. 62, pp. 461-474, 1993.

J.K. Lenstra, D.B. Shmoys & E. Tardos, "Approximation Algorithms for Scheduling Unrelated Parallel Machines" Mathematical Programming A, vol. 46, pp. 259-271, 1990.

* cited by examiner

*Primary Examiner*—Chau Nguyen
*Assistant Examiner*—Kerri M. Rose

(57) ABSTRACT

A system for, and method of, configuring border gateway selection for transit traffic flows in a computer network. In one embodiment, the system includes: (1) a border gateway modeler that builds a model of cooperating border gateways, the model including capacities of the border gateways and (2) a traffic flow optimizer, associated with the border gateway modeler, that initially assigns traffic to the border gateways in accordance with a generalized assignment problem and subsequently reassigns the traffic to the border gateways based on cost until the capacities are respected.

27 Claims, 7 Drawing Sheets

(a) AS Ingress/Egress Routers (b) Optimal Assignment (Single Egress)

(c) Optimal Assignment (Multiple Egress)

(d) Illegal Assignment (Multiple Egress)

FIG. 2 procedure GREEDY $(c[\,], p[\,], T[\,])$

1.) Use Shmoys Tardos Algorithm to compute assignment $f$ of jobs to machines for costs and processing times $c[\,], p[\,],$ and $T[\,]$
2. foreach machine $s$, let $U_s := \sum_{s:f(r)=s} p_{rs}$
3. Let VSet $:= \{s : U_s > T_s\}$
4. job $:= 1$
5. while job $> 0$ {
6.     job $:= 0$
7.     min_cost $:= \infty$
8.     foreach job $r$ such that $f(r) = s$ and $s \in$ Vset
9.         foreach machine $t$ not in Vset
10.             if $T_t - U_t > p_{rt}$ {
11.                 cost $:= \dfrac{c_{rt} - c_{rs}}{\min\{p_{rs}, U_s - T_s\}}$
12.                 if cost $<$ min_cost {
13.                     min_cost $:=$ cost
14.                     job $:= r$
15.                     old $:= s$
16.                     new $=: t$
17.                 }
18.             }
19.     if job $> 0$ {
20.         $f$(job) $:=$ new
21.         $U_{\text{old}} := U_{\text{old}} - p_{\text{job,old}}$
22.         $U_{\text{new}} := U_{\text{new}} + p_{\text{job,new}}$
23.         if $U_{\text{old}} \leq T_{\text{old}}$ then VSet $:=$ VSet $-\{$old$\}$
24.     }
25. }
26. return $f$

FIG. 3 procedure SINGLE EGRESS (ctr)
1. Let $f = \text{GREEDY}(c[], p[], T, [])$, where
   - There is a job $k$ for each prefix $P_k$ and a machine $j$ for each egress router $b_j$
   - $c_{kj} = \sum_h \min_{i \in In(h)} \{d(i,j)\} \cdot t(h,k)$ if $j \in Out(k)$; $\infty$ otherwise
   - $P_{kj} = \sum_h t(h,k)$ if $j \in Out(k)$; $\infty$ otherwise
   - $T_j = K_j$
2. foreach $h$, foreach $k$, set $\delta(h,k)[2] = f(k)$
3. while ctr $> 0$ {
4.    ctr := ctr−1
5.    Let $f = \text{GREEDY}(c[], p[], T, [])$, where
   - There is a job $(h,k)$ for each (AS, prefix) pair $(A_h, P_k)$ and a machine $i$ for each ingress router $b_i$
   - $C_{(h,k),i} = d(i, \delta(h,k)[2]) \cdot t(h,k)$ if $i \in In(h)$; $\infty$ otherwise
   - $P_{(h,k),i} = t(h,k)$ if $i \in In(h)$; $\infty$ otherwise
   - $T_i = C_i$
6.    foreach $h$, foreach $k$, set $\delta(h,k)[1] = f((h,k))$
7.    Let $f = \text{GREEDY}(c[], p[], T, [])$, where
   - There is a job $k$ for each prefix $P_k$ and a machine $j$ for each egress router $b_j$
   - $c_{kj} = \sum_h d(\delta(h,k)[1], j) \cdot t(h,k)$ if $j \in Out(k)$; $\infty$ otherwise
   - $P_{kj} = \sum_h t(h,k)$ if $j \in Out(k)$; $\infty$ otherwise
   - $T_j = K_j$
8.    foreach $h$, foreach $k$, set $\delta(h,k)[2] = f(k)$
9. }
10. return $\delta$

FIG. 4 procedure MULTIPLE EGRESS STEP 7($\delta$)

1. Solve linear relaxation of integer program (Constraints (9-13)) to obtain optimal fractional solution $y$
2. Compute assignment $f$ of $(A_h, P_k)$ pairs to egress routers $b_j$ by applying the Shmoys Tardos rounding algorithm to $y$
3. foreach $k, f_p(k) := \{f(h,k)\}$
4. pref := 1
5. $\delta'()[1] := \delta()[1]$
6. while pref > 0 {
7.    pref := 0
8.    min_cost := $\infty$
9.    $\delta()[2]$ := compute_egress $(\delta()[1], f_p)$
10.    foreach prefix $k$ {
11.      foreach egress router $j$ in $f_p(k)$ such that $V_j\delta > 0$ {
12.        $f'_p := f_p$
13.        $f'_p(k) := f'_p(k) - \{j\}$
14.        $\delta'()[2]$ := compute_egress $(\delta()[1], f'_p)$
15.        if VSet$^{\delta'} \subseteq$ VSet$^\delta$ and
$$\sum_l V_l^\delta - \sum_l V_l^{\delta'} > 0 \}$$
16.        cost := $\dfrac{C^{\delta'} - C^\delta}{\sum_l V_l^\delta - \sum_l V_l^{\delta'}}$
17.        if cost < min_cost {
18.          min_cost := cost
19.          pref := $k$
20.          egress := $j$
21.          action := delete
22.        }
23.      }
24.    }
25.      foreach egress router $j$ not in $f_p(k)$ such that $V_j\delta \leq 0$ {

CONTINUED ON SHEET 5/7

FIG. 4

CONTINUED FROM SHEET 4/7

$\downarrow$

26.      $f'_p := f_p$

27.      $f'_p(k) := f'_p(k) \cup \{j\}$

28.      $\delta'()[2] := \text{compute\_egress}(\delta()[1], f'_p)$

29.      if $V\delta_j \leq 0$ and $\sum_l V_l\delta - \sum_l V_l\delta' > 0$ {

30.          $\text{cost} := \dfrac{C^{\delta'} - C^{\delta}}{\sum_l V_l\delta - \sum_l V_l\delta'}$ 31.          if cost < min_cost {
32.              min_cost := cost
33.              pref := $k$
34.              egress := $j$
35.              action := insert
36.          }
37.         }
38.      }
39. }
40.    if pref > 0 and action = delete
41.      $f_p(pref) := f_p(pref) - \{egress\}$
42.    else if pref > 0 and action = insert
43.      $f_p(pref) := f_p(pref) \cup \{egress\}$
44. }
45. return $\delta$

SYSTEM AND METHOD FOR OPTIMALLY CONFIGURING BORDER GATEWAY SELECTION FOR TRANSIT TRAFFIC FLOWS IN A COMPUTER NETWORK

TECHNICAL FIELD OF THE INVENTION

The present invention is directed, in general, to computer networks and, more specifically, to a system and method for optimally configuring border gateway selection for transit traffic flows in a computer network.

BACKGROUND OF THE INVENTION

The primary responsibility of an Internet Service Provider (ISP) is to provide transit service from its set of customers to the remainder of the Internet and to bring traffic from its own upstream providers and peers destined to its customers. The interface from the ISP to the customers, upstream providers, and peers is through a set of border routers of the ISP. Currently, a border gateway protocol (BGP) allows border gateways ("border router" and "border gateway" will be used interchangeably) to be selected to carry transit traffic flows.

This responsibility is balanced with an objective of the ISP to minimize the resources used on its network in carrying transit traffic. The ISP wishes to get traffic "on its way" toward its ultimate destination as quickly as possible.

A poorly designed selection of border routers for the flows of traffic through the ISP can result in numerous problems. Ingress and/or egress traffic from/to neighbors may exceed the capacity of the selected border routers and its links, causing the ISP to fail to meet its responsibility. On the other side, underutilization of the potential capacity at border routers, or carrying traffic across the ISP network longer than necessary results in inefficient use of costly resources of the ISP.

Unfortunately, ISPs today have few tools or algorithms to help with this problem. Policies governing inter-domain routing and border router selection are arrived at manually through applying intuition, ad-hoc methods and constant tuning.

Accordingly, what is needed in the art is a better way to determine a selection of border routers used for ingress and egress of transit traffic that reduces, and ideally minimizes, provider network utilization and better balances the load of traffic flows from neighbors across the selected border routers by respecting capacity constraints.

SUMMARY OF THE INVENTION

To address the above-discussed deficiencies of the prior art, the present invention provides a system for, and method of, configuring border gateway selection for transit traffic flows in a computer network. In one embodiment, the system includes: (1) a model of the computer network that includes border routers and their capacities, and distances between the border routers and (2) a traffic flow optimizer, associated with the model. Given input data for transit traffic to the computer network, the traffic flow optimizer uses approximation techniques for integer programs and novel algorithms to improve (and advantageously maximize) resource usage and decrease (and advantageously minimize) cost in the computer network represented by the model.

The present invention is the first to address the problem of optimizing the cost of routing traffic through a provider's network while also considering load balancing based on the capacity of the border routers. Other work in BGP policy has focused on providing guidelines to assure stability of Internet routing (see, L. Gao and J. Rexford, "Stable Internet Routing Without Global Coordination," Proceedings of ACM SIGMETRICS, June 2000; and R. Govindan and A. Reddy, "An Analysis of Internet Inter-domain Topology and Route Stability," INFOCOM '97, April 1997, both incorporated herein by reference). The present invention, however, is best viewed as a form of traffic engineering. In contrast, previous work in this area has centered on intra-domain routing and the setting of weights for OSPF traffic across the provider network (see B. Fortz and M. Thorup, "Internet Traffic Engineering by Optimizing OSPF Weights," Proceedings of IEEE INFOCOM, 2000, pp. 519–528, incorporated herein by reference). The present invention is the first to take traffic engineering as a means of providing the right information to optimally set BGP policy to control inter-domain transit traffic flow.

In one embodiment of the present invention, the traffic flow optimizer assumes a single egress point for all traffic intended for a given address. Given this assumption, the optimization problem becomes an instance of what is known to those skilled in the pertinent art as the generalized assignment problem (GAP). The approximation algorithm may violate the capacity constraints of the border routers, so in a second phase, the traffic flow optimizer moves traffic from violated routers to routers with spare capacity. Traffic is moved so as to minimize the cost.

In one embodiment of the present invention, the traffic flow optimizer assumes multiple egress points can be used for traffic to a given address. However, these multiple egress points should respect the proximity constraints of the BGP. The traffic flow optimizer formulates this problem as an integer program then solves the linear program relaxation of the integer program. Approximation techniques are then used to round the linear program solution to an integer solution. The integer solution may violate proximity and capacity constraints, so, in a final phase, the traffic flow optimizer moves traffic from violated routers to routers with spare capacity. Again, traffic is moved so as to minimize the cost.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 2 illustrates a pseudo-code listing of a greedy heuristic for the generalized assignment problem;

FIG. 3 illustrates a pseudo-code listing of an iterative heuristic for single egress selection;

FIG. 4 illustrates a psuedo-code listing for step 7 of a multiple egress selection heuristic;

DETAILED DESCRIPTION

BGP and Inter-Domain Routing

Figure 1A:
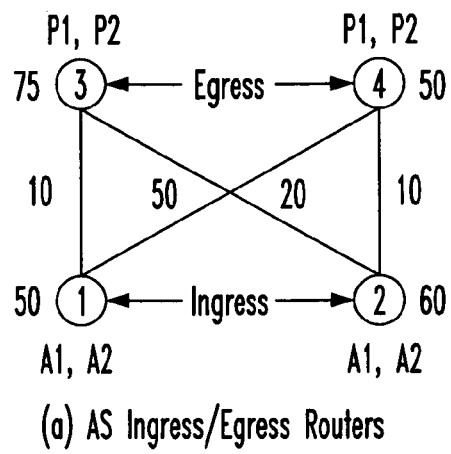
FIGS. 1A–1D together illustrate examples of optimal assignments for single and multiple egress cases.

To understand how to control the selection of border routers used for inter-domain routing of transit traffic flows and the input information available to solve the problem, one should first understand BGP and its use in inter-domain routing (see, Y. Rekhter and T. Li, "A Border Gateway Protocol 4," Internet-Draft (RFC1771), February 1998; and J. W. Stewart III, "BGP4: Inter-Domain Routing in the Internet," Addison-Wesley, 1999, both incorporated herein by reference).

The area of network infrastructure under a single technical and administrative control defines the boundaries of an Autonomous System (AS). Typically, an ISP is associated with a single AS. ASes interconnect via dedicated links and public network access points, and exchange routing reachability information through external BGP peering sessions. BGP itself is a distance vector protocol that allows import and export policies to modify the routing decision from the shortest-path default.

The unit of routability provided by BGP is the network prefix (or just prefix), which is an aggregation of IP addresses in a contiguous block (e.g., 10.20.30.0/24). A route advertisement is received from a neighbor AS over a BGP peering session and contains a prefix, an IP address of the next-hop, a multi-exit discriminator (MED) and a list of ASes along the path to the specified destination prefix. Receipt of an advertisement from a neighbor AS conveys the ability to egress data traffic toward the given prefix through that neighbor. Upon receiving an advertisement, a BGP speaker must decide whether or not to use this path and, if the path is chosen, whether or not to propagate the advertisement to neighboring ASes (after adding its own AS number to the AS path). When propagating an advertisement, the MED is used to differentiate the preference of the AS among a set of ingress routers.

BGP import policy allows an AS to favor one advertisement over another by assigning a local preference. The advertisement, with the assigned local preference, may then be disseminated among all the BGP speakers within the receiving AS1. An acceptance process then occurs wherein each BGP speaker picks the "best" route advertisement for each prefix. The decision criteria for the acceptance process proceeds as follows:

1. Accept the advertisement with the highest local-preference.
2. Break ties by accepting the advertisement with the shortest AS path.
3. Break ties by accepting the advertisement with the smallest MED.
4. Break ties by accepting the advertisement with the smallest intra-domain cost to the egress border router.
5. Break any remaining tie by accepting the advertisement with the smallest next-hop address.

Note that, since step 4 employs intra-domain cost, two BGP speakers may select different best advertisements for the same prefix, favoring the "closest" (in cost) egress border router.

The import policy and decision process described above control the selection of the border router used to egress traffic for any particular prefix. BGP export policy allows an AS to control ingress traffic as advertisements are propagated to neighbor ASes. In particular, the export policy may choose not to readvertise a route to a neighbor at a particular border router, or it may assign a MED value, or it may prepend the current AS number to the AS path some number of times, effectively discouraging use of the route through the current border router.

Problem Detail

Recall that the unit of routability for BGP, and thus the association of traffic to an ingress border router and to an egress border router, is the network prefix. The problem addressed in this paper becomes: for each neighbor and each prefix the ISP must transit traffic for, select an ingress border router and an egress border router for that traffic with the objective of optimizing network utilization. This selection must be accomplished respecting ingress and egress capacity constraints of the border routers, thus balancing prefixes between routers where such constraints would be violated.

A common approach to improving network resource utilization is to egress incoming traffic as quickly as possible. This is essentially equivalent to minimizing the total distance traversed by transit traffic within the ISP network, which in some sense represents the "cost" incurred by the ISP to carry the transit traffic. The focus is on minimizing this cost.

For each neighbor AS ingressing traffic for a particular prefix, a single ingress border router is selected. If a neighbor AS is connected to the provider through multiple border routers, different border routers may be selected for different prefixes, but a single prefix is not "split" among multiple ingress routers to the same neighbor. This allows the control necessary to account for all traffic for the prefix to ingress at the desired border router, which is natural given the prefix as the basic unit assigned to selected border routers. BGP export policies are employed to ensure that the proper advertisement is only propagated from the selected ingress router. The details will now be covered.

Problem Variants

Two variants of the problem distinguish themselves in how egress traffic is constrained to an egress border router.

In the first, simpler, variant, a single egress router is selected for each prefix. Thus, for all neighbors ingressing traffic destined for that prefix, traffic will egress from the same border router. This problem variant is referred to herein as Single Egress Selection (SES). Though simplified, SES is not an unreasonable simplification given the manner in which BGP operates. Given a set of advertisements for the same prefix, the acceptance process executed at all BGP speakers will select the same "best" route provided the tie-breaking procedure does not come down to step 4, intra-domain cost.

In practice, it is possible that egressing traffic for a prefix at multiple egress routers could improve network utilization. This is because the BGP acceptance process breaks ties between multiple candidate egress routers for a prefix (in step 4) based on the intra-domain cost to each router. The Multiple Egress Selection (MES) variant of the problem allows the egress for a given prefix to differ for two different neighbors. However, for any given neighbor, it is still the case that only a single egress router is selected for a particular prefix.

For both problem variants, mechanisms for controlling egress router selection through BGP are detailed below.

In addition to available topological information, including the set of border routers and their capacities, the set of neighbor connections, and the set of intra-domain distances, and the BGP provided information of the advertisements and prefixes, available traffic information is assumed to be available. Whether measured or estimated, this specifies the transit traffic from each neighbor AS to each prefix.

This router selection problem is, for purposes of the present discussion, assumed to be an off line problem, which is already quite challenging. Most of the information cited above is relatively static. For instance, in C. Labovitz, G. R. Malan and F. Jahanian, "Internet Routing Instability," in Proceedings of ACM SIGCOMM, 1997 (incorporated herein by reference), it is claimed that only a very small portion of BGP route advertisement updates each day reflect network events such as router failures and leased line disconnectivity. In fact, a majority of BGP updates were found to consist entirely of pathological duplicate withdrawals. The exception is the expected traffic which prior work has shown to have a periodicity across times of day and days of the week. This could be handled by solving the problem multiple times, once for each equivalence class of traffic pattern.

Results and Contributions

The present invention is the first to address the problem of optimizing the cost of routing traffic through a provider's network while also considering load balancing based on the capacity of the border routers. Other work in BGP policy has focused on providing guidelines to assure stability of Internet routing (Gao, et al., supra; and Govindan, et al., supra). The present invention, however, is best viewed as a form of traffic engineering. In contrast, previous work in this area has centered on intra-domain routing and the setting of weights for OSPF traffic across the provider network (Fortz, et al., supra). The present invention is the first to take traffic engineering as a means of providing the right information to optimally set BGP policy to control inter-domain transit traffic flow.

Problem formulations are specified as linear programs, and the generalized assignment problem (GAP) is a special case of formulations disclosed herein. Solving GAP is well-known to be NP-hard, so heuristics are presented for solving both the SES and the MES variants of the problem. Experiments show that the SES heuristic exhibits improvements of up to 26% over an intuitive heuristic based on routing the biggest jobs first.

System Model

For the transit provider AS under consideration, a set of neighbors $A_1, K, A_q, A1$ and a set of border routers $b_1, K, b_n$ linking the neighbors to the transit provider are given. Multiple neighbors may be connected to the AS through a given border router and each neighbor may be connected to the AS through multiple border routers.

TABLE I

| Notation | |
|---|---|
| Notation | Description |
| $P_1, K P_m$ | Set of network prefixes for transit routing |
| $A_1, K, A_q$ | Set of AS neighbors |

TABLE I-continued

| Notation | |
|---|---|
| Notation | Description |
| $b_1, K, b_n$ | Set of border routers |
| Out(k) | Set of egress routers for $P_k$ |
| In(h) | Set of ingress routers from neighbor $A_h$ |
| d(i, j) | Intra-domain distance between $b_i$ and $b_j$ |
| t(h, k) | Traffic flow from neighbor $A_h$ to prefix $P_k$ |
| $C_i$ | Ingress bandwidth capacity for router $b_i$ |
| $K_j$ | Egress bandwidth capacity for router $b_j$ |
| $\delta(h, k)$ | Ingress, egress router pair for traffic from AS $A_h$ to prefix $P_k$ |

For each neighbor $A_h$, let In(h) denote the set of border routers through which $A_h$ may ingress data traffic. Each border router $b_i$, has an ingress capacity constraint $C_i$ and an egress capacity constraint $K_j$. The intradomain topology provides the shortest path distance between any two border routers $b_i$ and $b_j$, which is denoted by d(i, j).

The external BGP peering sessions at the border routers receive advertisements for network prefixes. Let $P_1 K P_m$ denote the set of prefix advertisements received across all border routers and, for each such prefix $P_k$, let Out(k) denote the set of border routers at which an advertisement for $P_k$ has been received. This notation is employed, since these are the border routers that may egress outgoing data traffic destined for $P_k$. Also, for simplicity of exposition, it is assumed that the set of prefixes are non-overlapping. Finally, traffic may be measured or estimated between each neighbor $A_h$ and any destination prefix $P_k$. Let t(h,k) denote such traffic t(h,k). is set to zero for any neighbor $A_h$ for which it is not desired to transit traffic destined for $P_k$.

Note that the capacity constraints, $C_i$ and $K_j$ are specified per router. The solutions presented herein can be extended in a straightforward manner to provide for capacities specified on a border interface granularity.

Given this notation (see Table I for a summary), the problem statement for the two problem variants discussed above may be formulated.

Problem Statement

The BGP router selection problem involves selecting a pair of ingress and egress routers for traffic from each neighbor AS to every advertised prefix such that the total cost of carrying transit traffic is minimized. It is assumed that all the traffic from a neighbor to a specific prefix ingresses at a single border router. This can be ensured in BGP by either (1) setting the export policy to only advertise the prefix at the selected ingress router, or (2) including a relatively low MED value in the advertisement at the router, or (3) artificially extending the length of the AS path attribute at routers different from the selected router. Further, the selection of both ingress and egress border routers must be consistent with the BGP route acceptance mechanism.

MES Problem: Compute an assignment function $\delta: (\{1,K, q\}, \{1,K\ m\}) \to (\{1,K,n\}, \{1,K,n\})$ from (AS, prefix) pairs to (ingress, egress) router pairs such that $\Sigma_{h,k} t(h,k) \cdot d(\delta(h,k))$ is minimized, and $\delta$ satisfies the following constraints:

If $\delta(h,k)=(i,j)$, then $i \in In(h)$ and $j \in Out(k)$.

Ingress capacity constraints of routers are satisfied, that is, for all $i$, $\Sigma_{h,k:\delta(h,k)=(i,l)} t(h,k) \leq C_i$.

Egress capacity constraints of routers are satisfied, that is for all $j$, $\Sigma_{h,k:\delta(h,k)=(l,j)} t(h,k) \leq K_j$.

For a prefix $P_k$, if for some $h, \delta(h,k)=(i,j)$, then there does not exist a $g, i' \in In(g)$ and $l \in Q(i,j,k)$ such that $\delta(g,k)=(i',l)$.

The objective function of the MES problem requires that the computed $\delta$ minimizes the total distance traversed by transit traffic within the network, which reflects the cost of transporting transit traffic. While the intra-domain shortest path distance d is used in the objective function, other distance measures such as the minimum number of hops could be substituted in lieu of d. Also, in the final constraint, Q is a utility function that is used to specify, for a given ingress and egress router pair $b_i$ and $b_j$ and a given prefix $P_k$, the set of alternative egress routers for $P_k$ that are closer than $b_j$. Thus $Q(i,j,k)$ is defined as the set of routers $\{l | l \in Out(k) \wedge d(i,l) < d(i,j)\}^3$. This final constraint, which is referred to as the proximity constraint, ensures that an $(A_h, P_k)$ pair cannot be assigned an egress router $b_j$ if a g exists such that $(A_g, P_k)$ is assigned to an egress router $b_l, l \in Q(i,j,k)$.

The proximity constraint ensures that the choice of ingress and egress routers made by $\delta$ are enforceable in the context of the BGP selection process. In order to enable a set of routers $S \subseteq Out(k)$ to egress traffic for $P_k$, the import policy at each router in S assigns an equal (but high) local-preference to the advertisement for $P_k$ and manipulates the AS path so that they are equal. Thus, Step 4 of the BGP acceptance process is used to break ties, and each ingress router selects the closest router from S to egress traffic for $P_k$. The proximity constraint ensures that $\delta$ is indeed consistent with this choice.

The SES problem is identical to MES, except that the proximity constraint is replaced with the following constraint which forces all traffic for a prefix $P_k$ to egress through a single egress router.

For all $g, h, \delta(g,k)=\delta(h,k)$.

The single egress constraint for each prefix $P_k$ can be realized in BGP by setting a higher value for local-preference at the selected egress router for $P_k$ in the import policy.

EXAMPLE 1

Consider the AS illustration in FIG. 1A having four border routers $b_1, K, b_4$. Routers $b_1$ and $b_2$ serve as ingress routers (so $K_1=K_2=0$) with capacity constraints $C_1=50$ and $C_2=60$, respectively. Routers $b_3$ and $b_4$ are egress routers (so $C_1=C_2=0$) with bandwidth constraints $K_3=75$ and $K_4=50$, respectively. The intra-domain distances between ingress and egress routers are as shown in FIG. 1A. Thus, $d(1,3)=10$ and $d(1,4)=50$. Two prefixes $P_1$ and $P_2$ are advertised at both egress routers, and so $Out(1)=Out(2)=\{3,4\}$. Two AS neighbors $A_1$ and $A_2$ ingress data traffic through the ingress routers, so $In(1)=In(2)=\{1,2\}$. Finally, the amount of traffic from the AS neighbors to the destination prefixes is given by $t(1,1)=t(2,2)=30, t(1,2)=15$ and $t(2,1)=25$.

Figure 1B:
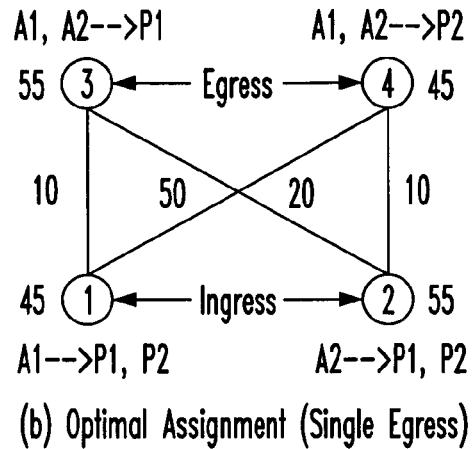

FIG. 1B depicts the optimal assignment $\delta_s$ for the single egress case. In the assignment, $\delta_s(1,1)=(1,3), \delta_s(1,2)=(1,4), \delta_s(2,1)=(2,3)$ and $\delta_s(2,2)=(2,4)$. Router $b_1$ ingresses all the traffic from $A_1$, while $b_2$ ingresses all traffic from $A_2$. Also, $b_3$ egresses traffic for $P_1$ and $b_4$ egress traffic for $P_2$. Assignment $\delta_s$ satisfies the ingress and egress capacity constraints of the routers, with traffic ingressing at $b_1$ and $b_2$ is 45 and 55, respectively, while the traffic egressing from $b_3$ and $b_4$ is 55 and 45, respectively. The total cost of transporting traffic is. Observe that $b_4$ cannot be chosen to egress all 55 units of traffic for $P_1$ since this would exceed its capacity constraint of 50. Similarly, alternate assignments like the one which selects $b_1$ to ingress all traffic for $P_2$ and $b_2$ to ingress all traffic for $P_1$, while meeting ingress capacity constraints, results in a substantially higher cost of 3350.

Figure 1C:
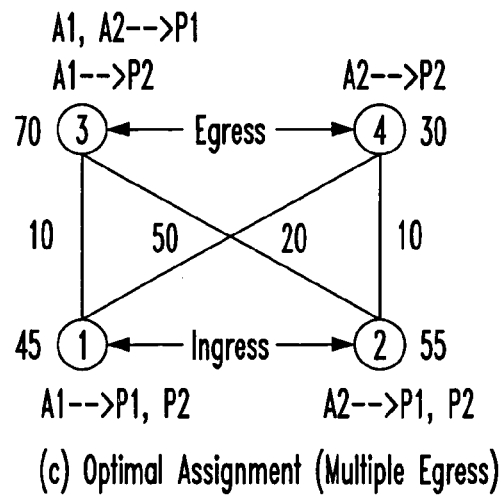
Figure 1D:
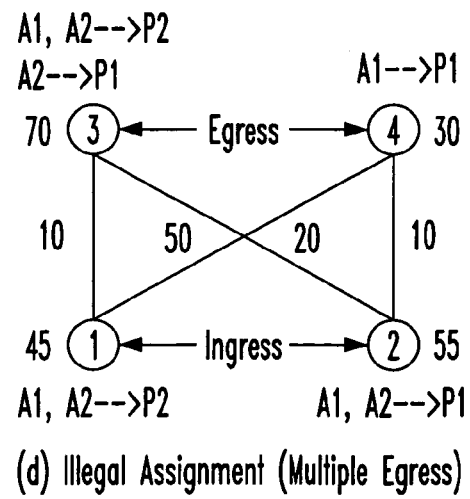

FIG. 1C illustrates the optimal assignment $\delta_m$ for the multiple egress case. Here, as for the single egress case above, $b_1$ ingresses traffic from $A_1$, $b_2$ ingresses traffic from $A_2$ and $b_3$ egresses traffic for $P_1$. However, egress traffic for $P_2$ is split between $b_3$ and $b_4$, with $b_3$ egressing traffic from $A_1$ to $P_2$ and $b_4$ egressing traffic from $A_2$ to $P_2$. The new assignment $\delta_m$ has a cost of 1250 which is lower than the cost of 1850 for $\delta_s$ presented above. In this case, the traffic from $A_1$ to $P_2$ traverses a shorter distance $d(1,3)=10$ in $\delta_m$ compared to $d(1,4)=50$ in $\delta_s$. Note that even though router $b_3$ egresses more traffic (70 units) in $\delta_m$, its capacity constraint of 75 is still not violated. Also, $\delta_m$ satisfies the proximity constraint since traffic for $P_2$ from $A_1$ and $A_2$ egress at routers $b_3$ and $b_4$, respectively, which are closest to the respective ingress routers for the traffic. FIG. 1D illustrates an example of an assignment that does not satisfy the proximity constraint. The assignment is illegal because traffic from $A_2$ to $P_1$ ingresses at router $b_2$ and egresses at router $b_3$ even though a closer router $b_4$ is egressing traffic for $P_1$ (from $A_1$).

Integer Program Formulation

The BGP router selection problem may be formulated as an integer program. For each prefix $P_k$ and each neighbor ingressing traffic for $P_k$, $A_h$, an ingress border router $b_i, i \in In(h)$ and an egress border router $b_j, j \in Out(k)$ should be selected. A variable $x_{ij}^{hk}$ is defined to denote such selection, so $x_{ij}^{hk}=1$ if $b_i$ is selected as the ingress router and $b_j$ is selected as the egress router for traffic from $A_h$ to prefix $P_k$, and $x_{ij}^{hk}=0$ otherwise.

The integer program for the BGP route advertisement problem is then formulated as follows:

$$\min \sum_k \sum_h \sum_{i \in In(h)} \sum_{j \in Out(k)} x_{ij}^{hk} \cdot d(i,j) \cdot t(h,k) \qquad (1)$$

subject to $$\forall j: \sum_{k: j \in Out(k)} \sum_h \sum_{i \in In(h)} x_{ij}^{hk} \cdot t(h,k) \leq K_j \qquad (2)$$

$$\forall i \sum_{h: i \in In(h)} \sum_k \sum_{j \in Out(k)} x_{ij}^{hk} \cdot t(h,k) \leq C_i \qquad (3)$$

$$\forall k, h: \sum_{i \in In(h)} \sum_{j \in Out(k)} x_{ij}^{hk} = 1 \qquad (4)$$

Equation (1) is the integer programming extension to the minimization objective noted for both problem variants in the problem statement. Likewise, equations (2) and (3) specify the egress and ingress capacity constraints in the integer program. Equation (4) is used to specify that, for any prefix and any neighbor to which that prefix must be advertised, the solution must include exactly one selected ingress router from the given neighbor and one selected egress router toward the destination prefix.

The formulation as presented thus far allows for multiple egress routers for a given prefix across different neighbors, but does not enforce the proximity constraint. To constrain the formulation further, an additional set of integer variables $z_j^k$ is defined such that $z_j^k=1$ if $b_j$ is chosen as an egress router for traffic to prefix $P_k$ for one or more ingress neighbors, and $z_j^k=0$ otherwise.

$$\forall h,k,i,j: x_{ij}^{hk} \leq z_j^k \quad (5)$$

$$\forall h,k,i,j: x_{ij}^{hk}, z_j^k \in \{0,1\} \quad (6)$$

$$\forall k,h,i \in In(h),$$

$$\forall j \in Out(k), j' \in Q(i,j,k): z_j^k + x_{ij'}^{hk} \leq 1 \quad (7)$$

Constraint (7) essentially captures the proximity constraint. This completes the integer programming formulation for the multiple egress selection.

To change the formulation for the single egress selection case, $z_j^k$ is further constrained. To assure that for a prefix $P_k$, only a single egress is selected across all border routers, Equation 7 is replaced by the following:

$$\forall k: \sum_{j \in Out(k)} z_j^k = 1 \quad (8)$$

Algorithms for Single Egress Variant

The SES problem can be shown to be a generalization of the generalized assignment problem (GAP) which is known to be NP-hard and has been well-studied in the operations research and theoretical computer science communities. See for example, J. H. Lin and J. S. Vitter, "∈-approximations with Minimum Packing Constraint Violation," Proceedings of the 24th Annual ACM Symposium on the Theory of Computation, Victoria, Canada, May 1992, pp. 771–782; and D. B. Shmoys and E. Tardos, "An Approximation Algorithm for the Generalized Assignment Problem," Mathematical Programming A, vol. 62, pp. 461–474, 1993, both incorporated herein by reference). The definition of GAP is as follows.

Generalized Assignment Problem: Given $\xi$ jobs and $\phi$ machines, a processing time $p_{rs}$ and cost $c_{rs}$ for processing job r on machine s, and a total processing time $T_s$ available for each machine s, compute an assignment $f:\{1,K,\xi\} \to \{1, K,\phi\}$ of jobs to machines such that:
the total cost of processing jobs is minimized, that is, $\Sigma_r C_{r,f(r)}$ is minimal, and
the processing time for jobs on each machine s does not exceed $T_s$, that is, $\Sigma_{r:f(r)=s} P_{rs} \leq T_s$.

To show that SES is at least as difficult as GAP and thus also NP-hard, GAP is shown to be only a special case of SES. Consider the instance of SES where |Out(k)|=1 for every prefix $P_k$, and $K_j$ for each egress router $b_j$ is very large. This corresponds to the case when there is only one egress router per prefix, and thus, egress routers for prefixes are held constant, as well as have unconstrained capacity. The resulting problem of computing ingress routers for each $(A_h, P_k)$ pair is equivalent to GAP, where each ingress router $b_i$ corresponds to a machine with total processing time $C_i$, and each $(A_h, P_k)$ pair corresponds to a job with processing time and cost on the machine for ingress router $b_i$ as follows (let $b_{jk}$ be the fixed egress router for prefix $P_k$)
Processing time: $t(h,k)$ if $i \in In(h); \infty$ otherwise.
Cost: $d(i,j_k) \cdot t(h,k)$ if $i \in In(h); \infty$ otherwise.

EXAMPLE 2

Revisiting Example 1, consider the AS in FIG. 1. Suppose that egress router $b_3$ is selected to egress traffic for prefix $P_1$ and egress router $b_4$ is chosen to egress traffic for $P_2$. Then, the problem of computing the optimal ingress routers for traffic from ASes $A_1$ and $A_2$ to prefixes $P_1$ and $P_2$ is equivalent to GAP. In the GAP instance, there are two machines 1 and 2 corresponding to ingress routers $b_1$ and $b_2$ with processing times $T_1=C_1=50$ and $T_2=C_2=60$. Further, there are four jobs corresponding to $(A_h,P_k)$ pairs (1,1), (1,2), (2,1) and (2,2). The processing time of job (1,1) on both machines is $t(1,1)=30$, while the processing time of job (1,2) is $t(1,2)=15$. The cost of processing job (1,1) on machine 2 is $d(2,3) \cdot t(1,1)=600$ (since $b_3$ is egress router for $P_1$), while that of processing job (1,2) on machine 1 is $d(1,4) \cdot t(1,2)=750$ (since $b_4$ is egress router for $P_2$) Clearly, the optimal assignment for the GAP instance is also the optimal cost assignment for the SES instance with egress routers for $P_1$ and $P_2$ held constant at $b_3$ and $b_4$, respectively.

It can be also be shown that, if ingress routers for each $(A_h,P_k)$ pair are held constant, then the problem of computing egress routers for each prefix can be mapped to GAP by considering each egress router $b_j$ to be a machine and each prefix $P_k$ to be a job with processing time and cost $\Sigma_h t(h,k)$ and $\Sigma_h d(i_{hk},j) \cdot t(h,k)$, respectively on machine j (here, $i_{hk}$ is the ingress router for the pair$(A_h,P_k)$).

GAP is not only intractable, but also very difficult to solve approximately. Even ignoring costs (e.g., setting all job costs to 0), it is intractable to compute an assignment of jobs to machines such that the total processing time constraints of machines is not violated (see, J. K. Lenstra, D. B. Shmoys and E. Tardos, "Approximation Algorithms for Scheduling Unrelated Parallel Machines," Mathematical Programming A, vol. 46, pp. 259–271, 1990, incorporated herein by reference). Thus, the only option available is to rely on heuristics to solve GAP, and its generalizations like SES.

The illustrated approach to solving the SES problem is iterative, and essentially relies on reducing it to GAP by fixing either the ingress or egress routers as described above. In each iteration, either the ingress or egress is held constant, and the resulting GAP instance is solved. The problem, however, is that existing algorithms for solving GAP do not guarantee that processing time constraints of machines will be met. Thus, in the following subsection, a heuristic for solving GAP without violating machine constraints should first be established, and subsequently use this as the building block for the illustrated SES heuristic.

Generalized Assignment Problem Heuristic

As mentioned above, much previous work has been performed on GAP, and good polynomial-time approximation algorithms for GAP exist that relax machine processing time constraints. Let C be the cost of the optimal solution to GAP that does not violate any capacity constraints. Then an $(\alpha,\beta)$ approximation algorithm for GAP is one that gives a solution with cost at most $\alpha C$ and with capacity constraints violated by, at most, a factor of $\beta$. The best known result is by Shmoys and Tardos, supra, where a (1,2) approximation algorithm is given. Lenstra, Shmoys and Tardos, supra, have also shown that it is NP-hard to obtain $(1,\beta)$ approximation algorithm for GAP for $\beta < 3/2$.

The algorithm of Shmoys and Tardos, supra, is based on first solving the LP relaxation of the integer programming formulation for GAP, and then rounding the fractional solution to a nearby integer solution. The total cost of the assignment computed by the Shmoys and Tardos algorithm is optimal, but, as noted above, the processing times of jobs assigned to a machine may exceed the machine's total processing capacity by at most a factor of 2 (thereby respecting a predetermined multiple of the capacities). FIG. 2 presents a greedy heuristic (Procedure GREEDY) that uses the assignment $f$ computed by the Shmoys Tardos algorithm as the basis to compute a new assignment $f'$ that satisfies processing time constraints and still has a low cost.

In Procedure GREEDY, jobs on machines in which processing times constraints are violated are re-assigned to other machines with sufficient capacity to process the jobs. This process of rescheduling jobs from violated machines to non-violated machines is continued until either no violated machines remain or no more jobs on violated machines can be re-assigned. The critical issue is which jobs on violated machines should be chosen for migration and which machines they should be migrated to. A greedy approach is adopted in which, during each iteration, the job $r$ and machine $t$ for which transferring $r$ to $t$ results in the smallest increase in cost per unit decrease in the violation amount is chosen. Note that in Step 11, $c_{rt} - c_{rs}$ is the increase in cost associated with re-assigning $r$ from $s$ to $t$, while $\min\{p_{rs}, U_s - T_s\}$ is the decrease in the violation.

The time complexity of Procedure GREEDY can be shown to be $O(\xi^2 \cdot \phi)$, but this is subsumed by the time complexity of the underlying Shmoys Tardos algorithm.

Single Egress Selection Problem Heuristic

The SES solution should compute the optimal cost assignment function $\delta$ from $(h,k)$ pairs to $(i,j)$ pairs, where $i \in \text{In}(h)$ and $j \in \text{Out}(k)$ are the ingress and egress routers, respectively, for traffic from AS $A_h$ to prefix $P_k$. Further, the computed assignment $\delta$ should also satisfy the bandwidth constraints of ingress and egress routers, and assign all pairs involving a specific prefix to a single egress router. A key observation, made earlier in the section, is that if the egress (ingress) routers for traffic involving all $(A_h, P_k)$ pairs were to be held constant, computing the minimum cost ingress (egress) routers that meet the constraints is essentially the GAP problem. Starting with an initial assignment of egress routers to $(A_h, P_k)$ pairs, GAP can be iteratively invoked to first compute a set of good ingress routers (for the initial egress routers), and then fix the newly computed ingress routers to compute a better set of egress routers by invoking GAP again, and so forth.

This is the idea underlying the heuristic presented in FIG. 3. Instead of computing the optimal ingress and egress routers for $(A_h, P_k)$ routers at the same time, the procedure computes them separately by fixing one or the other at their most recent values, and repeats this process for a sufficient number of iterations until the cost of the solution becomes stable.

The input parameter to Procedure SINGLEEGRESS is a counter that controls the number of iterations, where each iteration computes a new set of ingress/egress routers. The variable function $\delta$ keeps track of the most recent values of ingress and egress routers for $(A_h, P_k)$ pairs, with $\delta(h,k)[1]$ and $\delta(h,k)[2]$ denoting the ingress and egress routers for the pair $(A_h, P_k)$, respectively. For the initial assignment of egress routers to $(A_h, P_k)$ pairs, ingress router capacity constraints are ignored. This can be shown to be equivalent to the GAP problem with individual prefixes corresponding to jobs, egress routers corresponding to machines and costs/processing times for jobs on machines as described in step 1. For this infinite ingress capacity preliminary step, note the calculation of the cost $c_{kj}$ of assigning job $k$ (for prefix $P_k$) to machine $j$ (for egress router $b_j$). To minimize the overall cost, the ingress router $b_i, i \in \text{In}(h)$ that is closest to $b_j$ for the traffic from $A_h$ to $P_k$ is chosen. Also, the processing time $p_{kj}$ of job $k$ is constant for all machines $j$, and is the totality of traffic directed to $P_k$ from all the ASes. The assignment function $f$ as a result of solving GAP assigns prefixes to egress routers, which are captured in $\delta$ in step 2.

In the body of the while loop of the procedure, new ingress routers are computed in step 5 with egress routers held constant at their most recently computed values stored in $\delta(\ )[2]$, and new egress routers are computed in step 7 relative to the most recently computed ingress routers in $\delta(\ )[1]$. $\delta$ values are updated to reflect the newly computed values in steps 6 and 8. Note that when computing egress routers in step 7, each prefix is treated as a separate job, but in the computation of ingress routers in step 5, each (AS, prefix) pair becomes a separate job. This is because of the single egress constraint which is asymmetric and requires all $(A_h, P_k)$ pairs involving the same prefix to be assigned to a single egress router, while different $(A_h, P_k)$ pairs with identical prefixes or ASes, can be mapped to different ingress routers.

Algorithms for Multiple Egress Variant

An iterative approach similar to the one used for the single egress case (see FIG. 3) can also be used to compute multiple egress routers for each prefix. The high-level idea is again to fix one of ingress or egress routers for $(A_h, P_k)$ pairs, and then compute the other, and to repeat this process for a certain number of iterations. However, since prefixes can now have multiple egress routers, the simple approach of solving an instance of GAP with each prefix as a job as is done in step 7 of Procedure SINGLEEGRESS is not available. Instead, in this section, a new heuristic is proposed that for fixed ingress routers $\delta(h,k)[1]$, computes multiple egress routers for each prefix such that for each $(A_h, P_k)$ pair, the traffic from $A_h$ towards $P_k$ egresses through the egress router for $P_k$ that is closest to $\delta(h,k)[1]$, and egress router bandwidth constraints are not violated.

Procedure MULTIPLEEGRESS is similar to Procedure SINGLEEGRESS except for steps 5 and 7. step 1 which computes an initial assignment of egress routers for prefixes can be used as is. This is because the single egress router computed for each prefix in step 1 of SINGLEEGRESS satisfies both the bandwidth constraint as well as the constraint that traffic for each $(A_h, P_k)$ pair egress through the router for $P_k$ that is closest to the ingress router for $(A_h, P_k)$. step 5 of SINGLEEGRESS computes a single ingress router for each $(A_h, P_k)$ pair when the egress router for it is held constant at $\delta(h,k)[2]$. To handle multiple egress routers per prefix, Procedure MULTIPLEEGRESS requires only a slight modification to the $c_{(h,k),i}$ of assigning job $(h,k)$ to ingress router $b_i$. This is needed to reflect the fact that $(A_h, P_k)$ cannot be assigned to ingress router $b_i$ if there is an egress router for $P_k$ that is closer to $b_i$ than $\delta(h,k)[2]$ f. Thus, $c_{(h,k),i} = d(i, \delta(h,k)[2]) \cdot t(h,k)$ if $i \in \text{In}(h)$ and for every $g, \delta(g,k) \notin Q(i,j,k)$; otherwise, $c_{(h,k),i} = \infty$. Recall from above that $Q(i,j,k)$ denotes the set of egress routers in Out(k) that are closer to $b_i$ than $b_j$.

The remainder of this section focuses on developing a heuristic for step 7 that involves computing an egress router for each $(A_h, P_k)$ pair when the ingress router for it is held constant at $\delta(h,k)[1]$.

Integer Program Formulation for Step 7

In the multiple egress case, for a given prefix $P_k$, different $(A_h, P_k)$ pairs may be assigned different egress routers—this is a big departure from the single egress case where egress routers for all $(A_h, P_k)$ pairs are identical for a given prefix.

Thus, instead of a single job per prefix, a separate job (h,k) should be defined for each $(A_h, P_k)$ pair. A simple approach would be to solve GAP to compute egress routers in the same way ingress routers were solved in step 5 of Procedure SINGLEEGRESS.

The problem with using GAP in this manner is that it does not incorporate the additional proximity constraint which states that an $(A_h, P_k)$ pair cannot be assigned an egress router $b_j$ if a g exists such that $(A_g, P_k)$ is assigned to an egress router $b_1, l \in Q(i,j,k)$ Fortunately, the proximity constraint can be captured in an integer program, whose linear relaxation can subsequently be solved and rounded (using the Shmoys Tardos technique for GAP from Shmoys and Tardos, supra, to yield a better solution than simply solving GAP to compute the egress routers. Suppose that variable $y_j^{hk}$ is 1 if $b_j$ is chosen as the egress router for traffic from AS $A_h$ to prefix $P_k$, where the ingress router is held constant at $\delta(h,k)[1]$. The following integer program captures all the constraints on the selection of egress routers (for fixed ingress routers), while minimizing cost.

$$\min \sum_k \sum_h \sum_{j \in Out(k)} y_j^{hk} \cdot d(\delta(h,k)[1], j) \cdot t(h,k) \quad (9)$$

subject to the following constraints:

$$\forall h, k: \sum_{j \in Out(k)} y_j^{hk} = 1 \quad (10)$$

$$\forall j: \sum_{k: j \in Out(k)} \sum_h y_j^{hk} \cdot t(h,k) \leq K_j \quad (11)$$

$\forall g, h \forall k \forall j \in Out(k)$:

$$\sum_{l \in (Out(k) - Q(\delta(h,k)[1], j, k))} y_l^{hk} + \sum_{l \in Q(\delta(h,k)[1], j, k)} y_l^{gk} \leq 1 \quad (12)$$

$$\forall h, k, j: y_j^{hk} \in \{0,1\} \quad (13)$$

Without Constraint (12), the remaining constraints essentially reduce to GAP, with costs and processing times for jobs (h,k) and machines j as described for the GAP-based approach earlier in this subsection. Constraint (12) captures the proximity constraint by ensuring that if for some h,k and $j \in Out(k)$, the egress router for $(A_h, P_k)$ is not selected from $Q(\delta(h,k)[1], j, k)$ (that is, the egress router for $(A_h, P_k)$ is chosen from $Out(k) - Q(\delta(h,k)[1], j, k))$, then for all g, the egress router for $(A_g, P_k)$ cannot be chosen from $Q(\delta(h,k)[1], j, k)$. Note that the optimal fractional solution to the linear relaxation of the above integer program is a feasible solution to the LP without Constraint (12), which is essentially GAP. Thus, the LP rounding technique of Shmoys and Tardos can be used to compute an assignment of $(A_h, P_k)$ pairs to egress routers from the optimal fractional solution to the LP comprising of Constraints (9)–(12), since this fractional solution is a feasible solution to GAP.

Heuristic for Step 7

The assignment of $(A_h, P_k)$ pairs to egress routers obtained as a result of rounding the optimal fractional solution for the LP consisting of Constraints (9)–(12) has two basic problems: (1) The capacity constraints of egress routers may be violated (by at most a factor of 2), and (2) the proximity constraints may be violated. A Procedure MULTIPLEE-GRESSSTEP7 attempts to remedy this by using heuristics to reassign $(A_h, P_k)$ pairs to egress routers such that both capacity as well as proximity constraints are met. The pseudo-code for this procedure is set forth in FIG. 4. Procedure MULTIPLEEGRESSSTEP7 accepts as an input parameter the assignment $\delta$ for which $\delta( )[1]$ stores the most recently computed ingress router for each $(A_h, P_k)$ pair. It computes in $\delta( )[2]$ new egress routers for each $(A_h, P_k)$ pair without modifying any of the input ingress router assignments. Further, Procedure MULTIPLEEGRESSSTEP7 attempts to ensure that the returned assignment $\delta$ satisfies both capacity as well as proximity constraints.

As discussed earlier, the assignment $f$ computed in step 2 may not meet capacity and proximity constraints. Suppose that for each prefix $P_k$, $f_p(k)$ is the set of all egress routers for prefix $P_k$ (step 3). Then, for the ingress routers specified by $\delta( )[1]$ and for egress routers for prefixes as in $f_p(k)$, a unique assignment $\delta( )[2]$ exists that maps each $(A_h, P_k)$ pair to an egress router, and that satisfies the following two properties: (1) $\delta$ satisfies proximity constraints, and (2) for all $h, k, \delta(h,k)[2] \in f_p(k)$. To see this, suppose for an $(A_h, P_k)$ pair, $j \in f_p(k)$ is the egress router closest to $\delta(h,k)[1]$, the ingress router for the pair. Then $\delta(h,k)[2]=j$ satisfies the above two properties. A function called compute egress in MULTIPLEEGRESSSTEP7 returns such a $\delta( )[2]$.

Procedure MULTIPLEEGRESSSTEP7 iteratively applies one of two basic transformations to $\delta$ to reduce the total violation amount. The first is to delete a violated egress router j from $f_p(k)$ for a prefix $P_k$. This has the effect of diverting all the egress traffic for $P_k$ passing through j to other routers, thus decreasing the degree to which j is violated. Note, however, that the violation amount of other routers carrying the re-directed traffic from j could increase. The second primitive transformation is to add an egress router j that satisfies capacity constraints to $f_p(k)$ for a prefix $P_k$. This has the potential to reduce the violation amount by assigning to j, egress traffic for $P_k$ passing through other violated egress routers. It is straightforward to observe that addition of router j to $f_p(k)$ can cause the violation amount for only j (and no other router) to increase. Procedure MULTIPLEEGRESSSTEP7 repeatedly applies one of the two transformations to $\delta$ until no capacity constraints are violated or there is no remaining transformation for reducing the violation amount.

In Procedure MULTIPLEEGRESSSTEP7 $V_j^\delta = \max\{0, \Sigma_{h,k \ \delta(h,k)[2]=j} t(h,k) - K_j\}$ represents the amount by which capacity of egress router j is violated, and $C^\delta = \Sigma_h \Sigma_k t(h,k) \cdot d(\delta(h,k)[1], \delta(h,k)[2])$ represents the cost of transporting traffic from ASes to prefixes. In each iteration of the main loop of the procedure, the prefix $P_k$ and egress router j is chosen for which the increase in cost per unit decrease in violation amount is minimum; that is, if $\delta'$ is the new assignment (that satisfies proximity constraints) after deleting or inserting j from $f_p(k)$, then $$\frac{C_j^{\delta'} - C_j^\delta}{\sum_l V_l^\delta \sum_l V_l^{\delta'}}$$

is minimum. An egress router j is a candidate for addition/deletion from $f_p(k)$ only if (1) the operation results in a decrease in the overall amount of violation of the capacity constraints of egress routers, and (2) the operation does not cause an egress router that previously satisfied capacity constraints to now violate them.

Finally, for a prefix $P_k$, only egress routers j that violate capacity constraints are candidates for deletion, while for insertion only routers that satisfy capacity constraints are candidates.

Bressoud, et al., supra, demonstrates that the worst-case complexity of Procedure MULTIPLEEGRESSSTEP7 is $O(n^2 \cdot m \cdot q \cdot (m+\log n))$.

Figure 5:
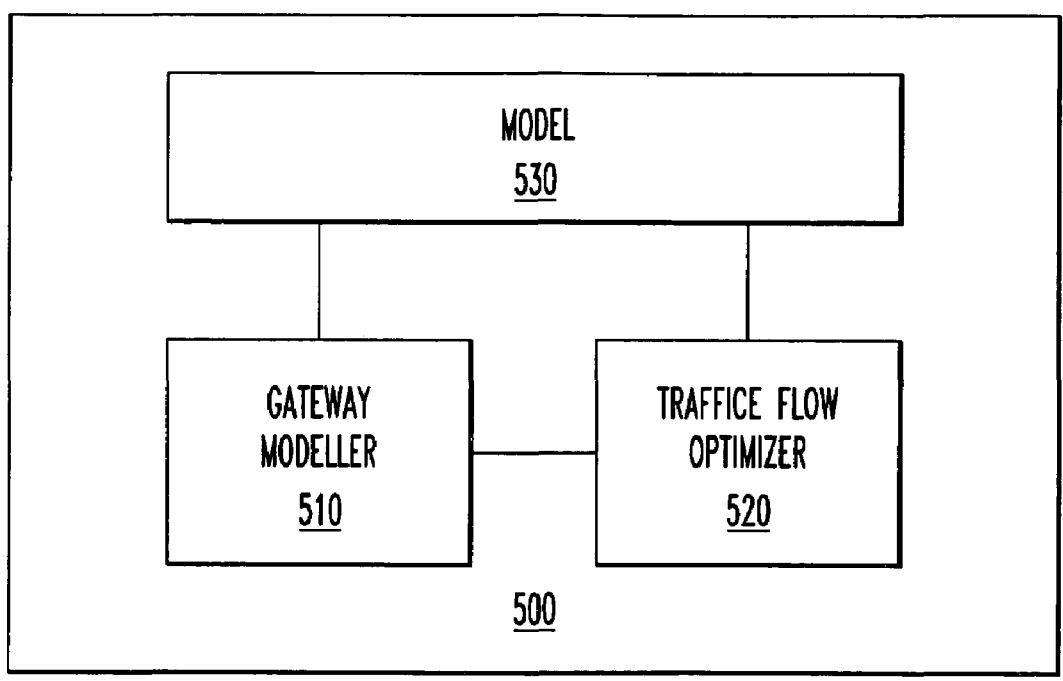
FIG. 5 illustrates a block diagram of one embodiment of a system for configuring border gateway selection for transit traffic flows in a computer network constructed according to the principles of the present invention.

Turning now to FIG. 5, illustrated is a block diagram of one embodiment of a system, generally designated 500, for configuring border gateway selection for transit traffic flows in a computer network constructed according to the principles of the present invention.

The system 500 includes a border gateway modeler 510. The border gateway modeler 510 builds a model 530 of cooperating border gateways. The model 530 includes capacities of the border gateways as described above.

The system 500 further includes a traffic flow optimizer 520. The traffic flow optimizer is associated with the border gateway modeler 510 and analyzes traffic thus. First, the traffic flow optimizer 520 assigns traffic to the border gateways in accordance with GAP. Next, the traffic flow optimizer 520 reassigns the traffic to the border gateways based on cost until the capacities are respected (i.e., such that no capacities are violated). In the illustrated embodiment of the present invention, the system 500 is embodied in a sequence of software instructions executable in a computer. The heuristics of FIGS. 2 and 3 are examples of the processes that can be carried out within the system 500.

Figure 6:
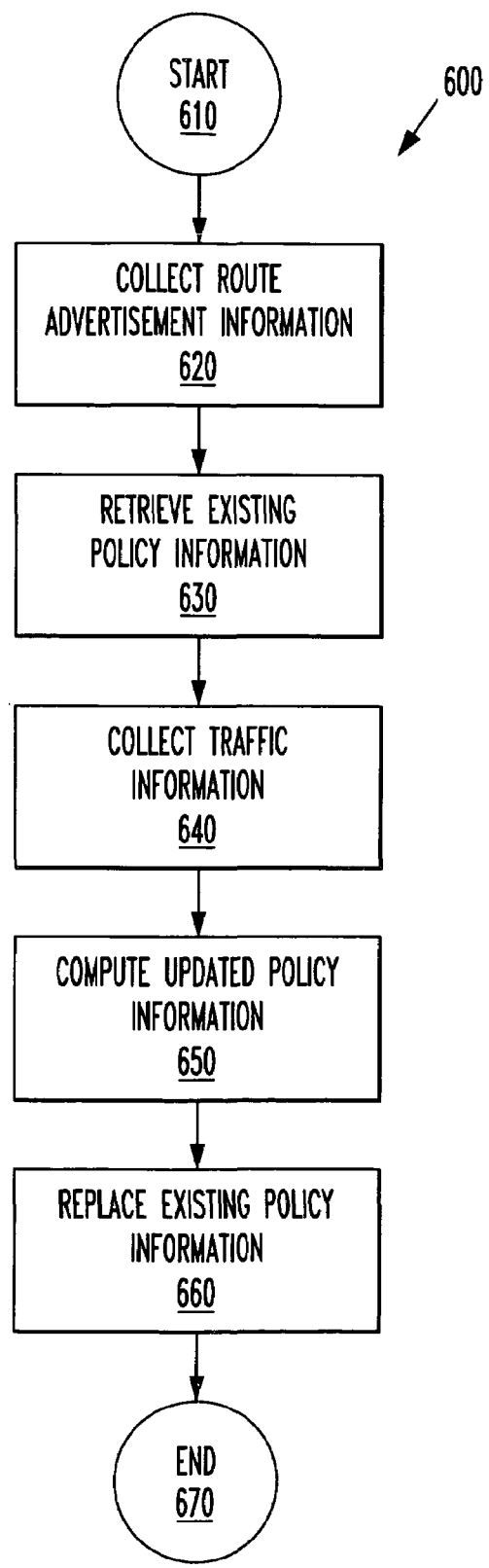
FIG. 6 illustrates a method of managing a computer network carried out according to the principles of the present invention.

Turning now to FIG. 6, illustrated is a method, generally designated 600, of managing a computer network carried out according to the principles of the present invention. The method 600 begins in a start step 610, wherein it is desired to improve, and advantageously optimize, the operation of the border routers of a computer network (which may be an AS). The method 600 may be carried out upon configuration of the network or during operation of the computer network. During operation, the method 600 may be carried out, e.g., per a predetermined schedule, periodically according to a predetermined interval, in response to computer network operating conditions or upon explicit command.

Once started, the method 600 calls for the collecting of route advertisement information from border routers in the computer network (a step 620). The method 600 further calls for the retrieving of existing policy information regarding each of the border routers (a step 630). The method further calls for the collecting of traffic information regarding each of the border routers (a step 640). The steps 620, 630 640 can be carried out in any desired order. Further, the method 600 may call for the collection of further data from the computer network as may be advantageous to a particular application.

Next, in a step 650, the method calls for employing the route advertisement information, the existing policy information and the traffic information to compute updated policy information. This may be performed in accordance with the above general teachings or in any other advantageous manner. Finally, to ensure that the computer network operates in accordance with the updated policy information, the method 600 calls in step 660 for the replacing of the existing policy information with the updated policy information. In this manner, it is expected that traffic through the computer network will be decreased, and perhaps minimized. The method ends in an end step 670.

Although the present invention has been described in detail, those skilled in the art should understand that they can make various changes, substitutions and alterations herein without departing from the spirit and scope of the invention in its broadest form.

What is claimed is:

1. A system for configuring border gateway selection for transit traffic flows in a computer network, comprising:
   a border gateway modeler that builds a model of cooperating border gateways, said model including capacities of said border gateways; and
   a traffic flow optimizer, associated with said border gateway modeler, that initially assigns traffic to said border gateways in accordance with a generalized assignment problem and subsequently reassigns said traffic to said border gateways based on cost until said capacities are respected, wherein said cost is associated with route advertisement information comprising a network prefix, an Internet Protocol address of a next-hop, a multi-exit discriminator, and a list of autonomous systems along a path to a specified destination network prefix.

2. The system as recited in claim 1 wherein said cooperating border gateways are associated with an autonomous system.

3. The system as recited in claim 1 wherein said traffic flow optimizer assumes a single egress point for traffic intended for a given address.

4. The system as recited in claim 1 wherein said traffic flow optimizer assumes multiple egress points for traffic intended for a given address.

5. The system as recited in claim 1 wherein said traffic flow optimizer reassigns said traffic to said border gateways by solving a linear programming relaxation of an integer programming formulation for said generalized assignment problem.

6. The system as recited in claim 1 wherein said capacities are selected from the group consisting of:
   ingress capacities, and
   egress capacities.

7. The system of claim 1, wherein said traffic flow optimizer is further configured to:
   a) accept an advertisement among a plurality of advertisements with the highest local preference;
   b) if a tie occurs in (a), break the tie among the plurality of advertisements that are tied in the highest local preference by accepting an advertisement of the plurality of advertisements with a shortest associated system path;
   c) if a tie occurs in (b), break the tie among the plurality of advertisements that are tied in their shortest associated system path by accepting an advertisement of the plurality of advertisements with a smallest multi-exit discriminator;
   d) if a tie occurs in (c), break the tie among the plurality of advertisements that are tied in their smallest multi-exit discriminator by accepting an advertisement with the smallest intra-domain cost to an egress border router; and
   e) if a tie occurs in (d), break the tie among the plurality of advertisement that are tied in their smallest intra-domain cost to an egress border router by accepting an advertisement with the smallest next-hop address.

8. A system for configuring border gateway selection for transit traffic flows in a computer network, comprising:

a border gateway modeler that builds a model of cooperating border gateways including capacities thereof; and a traffic flow optimizer, associated with said border gateway modeler, that initially assigns traffic to said border gateways in accordance with a generalized assignment problem and subseguenily reassigns said traffic to said border gateways based on cost until said capacities are respected, wherein said traffic flow optimizer holds certain of said capacities constant while reassigning said traffic to said border gateways.

9. The system as recited in claim 8, wherein said traffic flow optimizer selects a single egress of said traffic for reassignment to said border gateways.

10. The system as recited in claim 8, wherein said traffic flow optimizer selects multiple egresses of said traffic for reassignment to said border gateways.

11. The system as recited in claim 8, wherein said traffic flow optimizer reassigns said traffic to said border gateways based on cost until proximity constraints and said capacities are respected.

12. A method of configuring border gateway selection for transit traffic flows in a computer network, comprising:
building a model of cooperating border gateways, said model including capacities of said border gateways;
initially assigning traffic to said border gateways in accordance with a generalized assignment problem; and
subsequently reassigning said traffic to said border gateways based on cost until said capacities are respected, wherein said cost is associated with route advertisement information comprising a prefix, an Internet protocol address of a next-hop, a multi-exit discriminator, and a list of autonomous systems along a path to a specified network destination prefix.

13. The method as recited in claim 12 wherein said cooperating border gateways are associated with an autonomous system.

14. The method as recited in claim 12 wherein said initially assigning comprises assuming a single egress point for traffic intended for a given address.

15. The method as recited in claim 12 wherein said initially assigning comprises assuming multiple egress points for traffic intended for a given address.

16. The method as recited in claim 12 wherein said subsequently reassigning comprises reassigning said traffic to said border gateways by solving a linear programming relaxation of an integer programming formulation for said generalized assignment problem.

17. The method as recited in claim 12 wherein said capacities are selected from the group consisting of:
ingress capacities, and
egress capacities.

18. A method of configuring border gateway selection for transit traffic flows in a computer network, comprising:
building a model of cooperating border gateways including capacities thereof;
initially assigning traffic to said border gateways in accordance with a generalized assignment problem; and
subsequently reassigning said traffic to said border gateways based on cost until said capacities are respected, wherein said subsequently reassigning comprises holding certain of said capacities constant.

19. The method as recited in claim 18 wherein said subsequently reassigning comprises selecting a single egress of said traffic for reassignment to said border gateways.

20. The method as recited in claim 18 wherein said subsequently reassigning comprises selecting multiple egresses of said traffic for reassignment to said border gateways.

21. The method as recited in claim 18 wherein said subsequently reassigning said traffic to said border gateways based on cost until proximity constraints and said capacities are respected.

22. A method of managing a computer network, comprising:
collecting route advertisement information from border routers in said computer network, wherein said route advertisement information comprises a network prefix, an Internet Protocol address of a next-hop, a multi-exit discriminator, and a list of autonomous systems along a path to a specified destination network prefix;
retrieving existing policy information regarding each of said border routers;
collecting traffic information regarding each of said border routers;
employing said route advertisement information, said existing policy information and said traffic information to compute updated policy information; and
replacing said existing policy information with said updated policy information to decrease traffic through said computer network.

23. The method as recited in claim 22 wherein said method is carried out repeatedly during an operation of said computer network.

24. The method as recited in claim 22 wherein said method is repeated at user-defined intervals during an operation of said computer network.

25. The method as recited in claim 22 wherein said computer network is an autonomous system.

26. The method as recited in claim 22 wherein said employing comprises assuming a single egress point for traffic intended for a given address.

27. The method as recited in claim 22 wherein said employing comprises assuming multiple egress points for traffic intended for a given address.

* * * * *